United States Patent

Schönfelder et al.

[11] Patent Number: 5,957,109
[45] Date of Patent: Sep. 28, 1999

[54] METHOD AND DEVICE FOR CONTROLLING AN ACTUATOR ELEMENT

[75] Inventors: Dietbert Schönfelder, Gerlingen; Kai-Lars Barbehön, Ludwigsburg; Joachim Tauscher, Stuttgart; Wolfgang Dörr, Ludwigsburg, all of Germany

[73] Assignee: Robert Bosch GmbH, Stuttgart, Germany

[21] Appl. No.: 09/043,401

[22] PCT Filed: Apr. 19, 1996

[86] PCT No.: PCT/DE96/00694

§ 371 Date: Aug. 25, 1998

§ 102(e) Date: Aug. 25, 1998

[87] PCT Pub. No.: WO97/11266

PCT Pub. Date: Mar. 27, 1997

[30] Foreign Application Priority Data

Sep. 23, 1995 [DE] Germany ............ 195 35 419

[51] Int. Cl.⁶ ...................................... F02D 31/00
[52] U.S. Cl. ............................... 123/357; 123/502
[58] Field of Search ........................... 123/357, 500, 123/501, 502

[56] References Cited

U.S. PATENT DOCUMENTS

| 4,121,547 | 10/1978 | Asano . |
| 4,476,832 | 10/1984 | Fujimori ............... 123/502 |
| 4,691,676 | 9/1987 | Kikuchi ............... 123/399 |

FOREIGN PATENT DOCUMENTS 35 13791  10/1986  Germany .

Primary Examiner—Thomas N. Moulis
Attorney, Agent, or Firm—Kenyon & Kenyon

[57] ABSTRACT

A process and device for triggering an actuator are described, in particular an actuator triggered in cycles for an internal combustion engine. The triggering signal frequency can be changed to prevent resonance effects. The triggering signal frequency is varied between a first and a second limit value over time according to a preselected function.

13 Claims, 4 Drawing Sheets

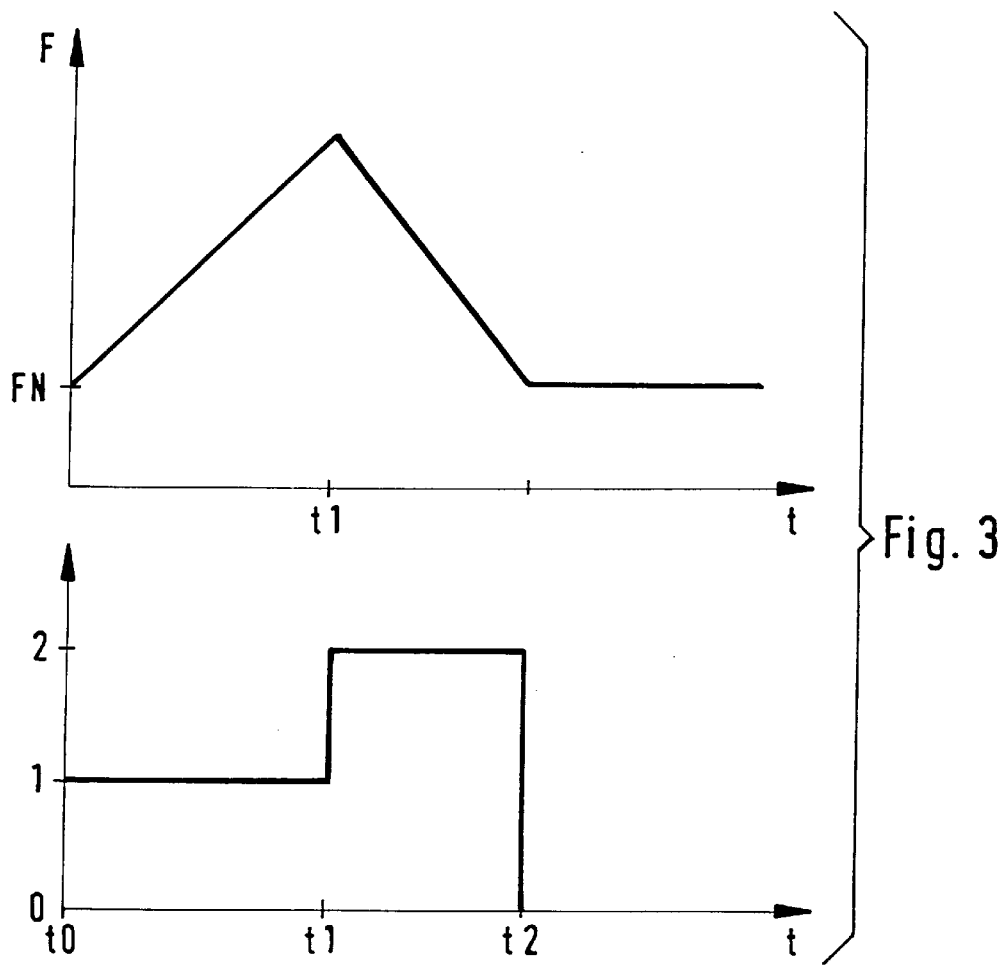
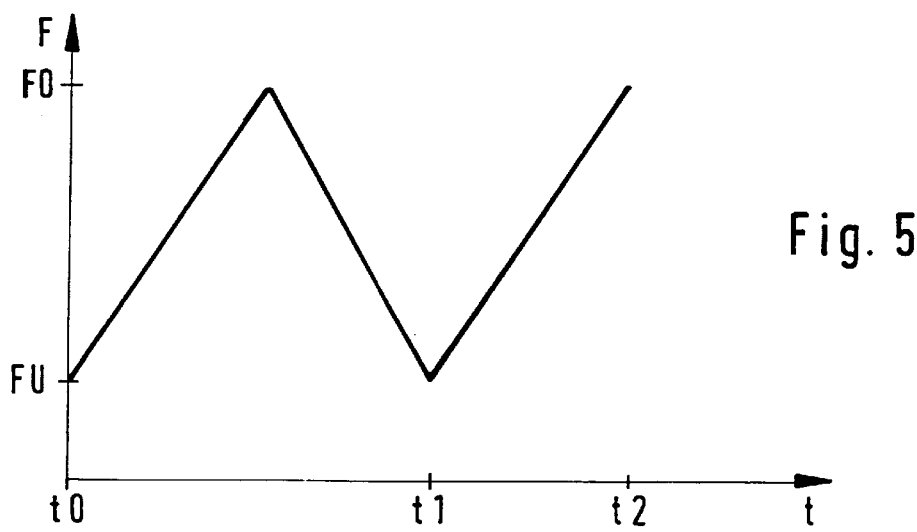
Fig. 3
Fig. 5

METHOD AND DEVICE FOR CONTROLLING AN ACTUATOR ELEMENT

FIELD OF THE INVENTION

1. Background of the Present Invention

The invention relates to a process and a device for triggering an actuator, in particular a cycled actuator in a motor vehicle.

2. Background Information

German Patent Application No. 33 25 651 describes a process and device in which, to function engine speed. Such operating mode is very complicated and makes recalculation of the triggering frequency for each engine speed necessary.

Furthermore, German Auslegungsschrift 35 13 791 describes an electronic control system for internal combustion engines that comprises a stepper motor. Furthermore, German Patent Application No. 35 13 791 describes an electronic control system for internal combustion engines that includes a stepper motor. The stepper motor is triggered in cycles with a stepping frequency. The stepping frequency is changed between first and second limit values step-by-step according to a preselected time program or continuously. This stepper motor is triggered in cycles with a stepping frequency. The stepping frequency is changed between a first and a second limit values step by step according to a preselected time program or continuously.

In addition, it is known that the triggering frequency is switched between one or more values when the engine speed assumes specific values. The disadvantage in this process is that the actuator reacts to such switching processes with vibrations and/or with output signal oscillations.

OBJECT OF THE INVENTION

The object of the invention is to eliminate simply and cost-effectively fluctuations, in particular in the operating ranges presenting danger of resonance and in non-critical operating ranges. In dynamic operation, for example when rapidly driving through the resonance range, optimum actuator triggering also results, since here there is only a slight change in triggering or none at all. Because of the smooth transition in critical ranges, there are only slight effects or no effects at all on the position of the actuator. In addition, the application of the control is simplified considerably.

BRIEF DESCRIPTION OF THE DRAWINGS

FIG. 3 shows the frequency of a triggering signal over time.

FIG. 5 shows a triggering frequency over time, which results from the second exemplary embodiment.

In the following, the operating mode according to the present invention is described using an example of an injection actuator in a diesel internal combustion engine. However, the procedure according to the present invention is not restricted to this application, but it can be used for all actuators that are triggered in cycles and in which resonance may occur.

DETAILED DESCRIPTION OF THE INVENTION

The start of supply of the fuel pump can be changed using the injection actuator. Usually, the process is such that the start of supply or the start of injection is controlled with the use of a control circuit, and the actuator is triggered as a function of the control deviation. Preferably the injection actuator is designed as an electro-hydraulic actuator. The injection actuator assumes different positions as a function of the pressure acting on the actuator. The pressure applied to the injection actuator can be influenced by a solenoid. A cycled signal is applied to the solenoid. The duty cycle and the frequency of the signal can be preselected.

Figure 1:
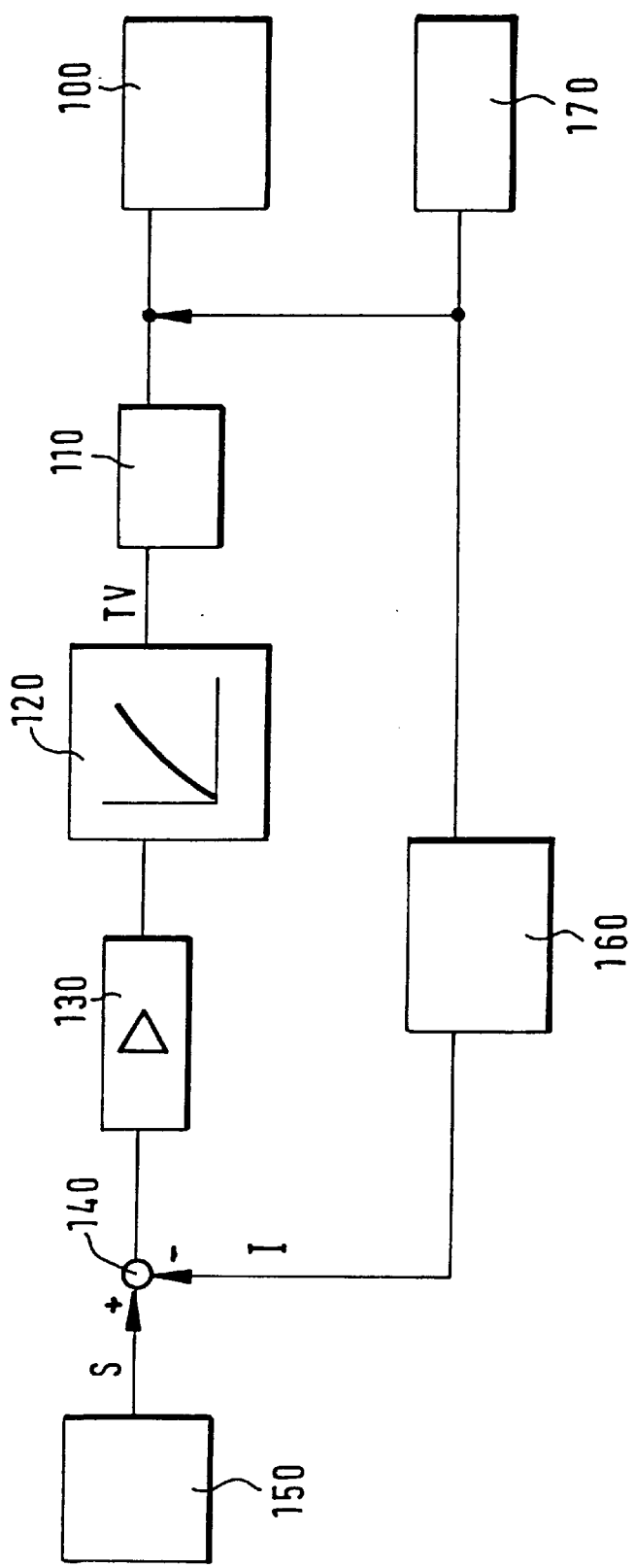
FIG. 1 shows a block diagram of a device according to the present invention for triggering an actuator.

FIG. 1 shows, as an example, the device according to present the invention in the form of a block diagram. A controlled system is identified with 100. This controlled system is preferably the injection actuator of a diesel internal combustion engine. The position of the injection actuator can be changed using actuator 110. Actuator 110 is designed as a solenoid. A cycled signal TV from triggering signal selector 120 is applied to the solenoid. The triggering signal selector 120 receives the output signal of the injection actuator controller 130. Injection actuator controller 130 processes the output signal of node 140, to which a reference value S of a reference value selector 150 is supplied with positive sign, and actual value I of actual value determiner 160 is supplied with negative sign. Starting from the actual start of injection 170 detected, e.g., with a sensor that is not shown, actual value determiner 160 calculates the actual value for injection actuator controller 130.

On the basis of various operating variables, reference value selector 150 calculates reference value S for the position of injection actuator 100. On the basis of the comparison between reference value S and actual value I, injection actuator controller 130 calculates a manipulated variable. On the basis of this manipulated variable, triggering signal selector 120 calculates a signal TV to apply to solenoid 110. In this process, duty cycle TV and triggering frequency F can be preselected.

As a function of this signal, in particular on the duty cycle, a specific pressure is set in the hydraulic system and the injection actuator assumes an appropriate position. The triggering frequency F has only a very slight influence on the injection actuator position. As a function of the position of injection actuator 100, injection occurs at various angle positions of the crankshaft in the internal combustion engine. The actual start of injection is detected and on the basis of this variable, actual value determiner 160 determines actual value I for the control circuit.

As a function of triggering frequency F, injection frequency and engine speed of the internal combustion engine, resonance occurs because of hydraulic effects. Open- and/or closed-loop controllers in which a cycled actuator 110 is used to convert the controller signals can become resonant, i.e., unstable, because of periodic interference signals, the frequency of which coincides with the actuator triggering frequency or its multiple. In certain actuators, in particular in the actuator described for the injection actuator, interfering influences can clearly be attributed to specific operating conditions and thus recognized.

According to the present invention, in the range of resonance danger, triggering frequency F of the actuator is set off-resonance using a time function so that the interference signal is adequately differentiated from the triggering frequency. Because of the applicability of off-resonance setting, manipulated variable errors can be compensated by the controller. According to the present invention, it was recognized that resonance effects occur in specific engine speed ranges. A window is placed around this engine speed range. If the actual engine speed is in this window, triggering frequency off-resonance setting is activated over a ramp-up. If the engine speed occurs outside the window, the ramp-up slope reverses and off-resonance setting is discontinued. With a fast transition over the entire window, only very slight off-resonance setting occurs. If the engine speed crosses the window very slowly or is steady in the critical range, the ramp-up runs into a limit, i.e., the frequency of the signal is held at a non-critical value.

Figure 2:
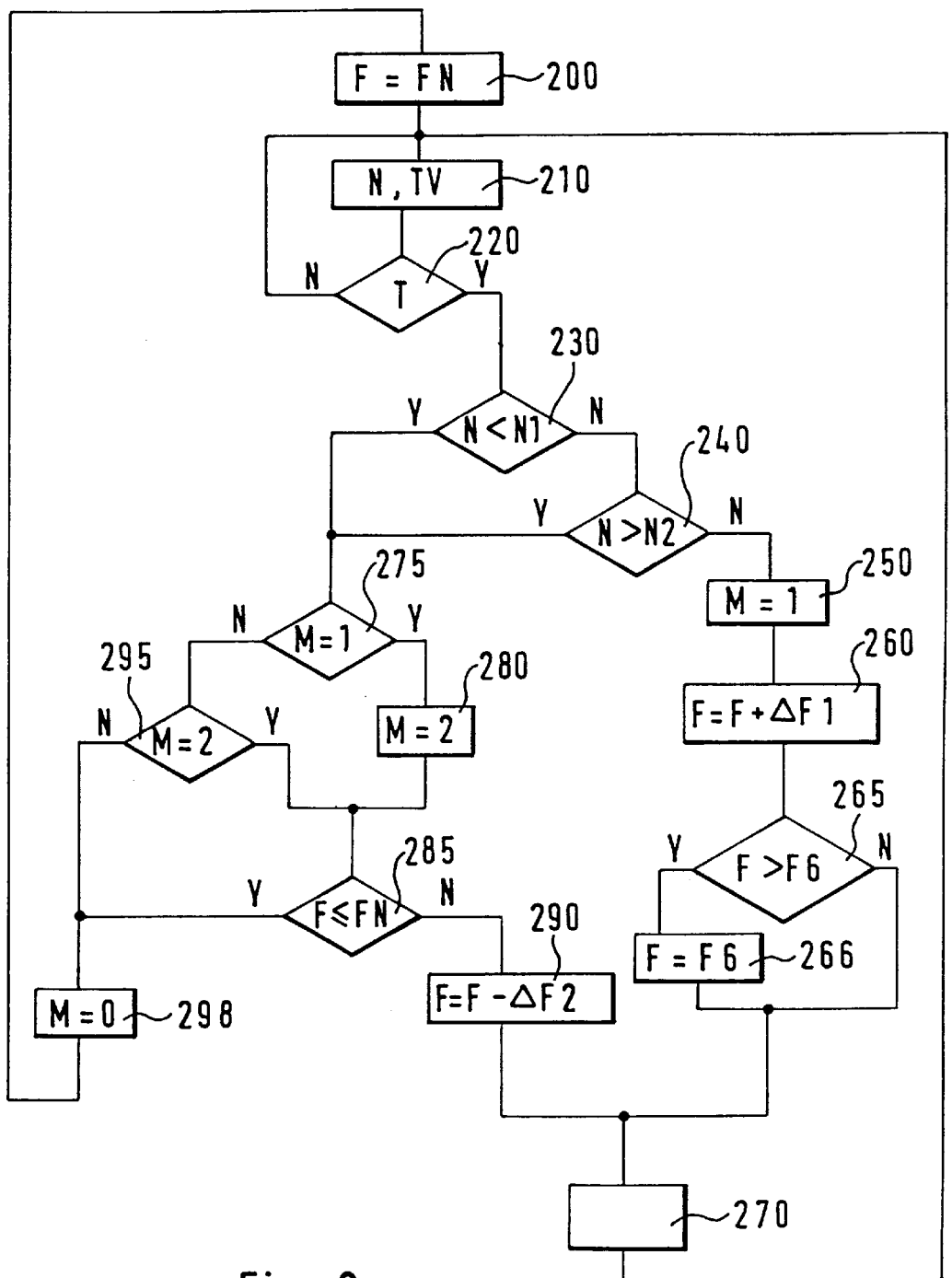
FIG. 2 shows a flow chart of a first exemplary embodiment of the process according to the present invention.

FIG. 2 shows an exemplary embodiment of the process according to the present invention for preventing resonance. In first step 200, triggering frequency F is set to value FN that can be specified. In subsequent step 210, the engine speed is detected and duty cycle TV, which has to be applied to the actuator in order to reach a reference position, is determined.

Subsequent query 220 checks whether time condition T is fulfilled. If not, step 210 follows again, otherwise if the time condition is fulfilled, query 230 follows. This query checks whether the engine speed is less than threshold value N1. If not, query 240 checks whether engine speed N is greater than threshold value N2. If this is not true either, the engine speed lies in the engine speed window in which resonance effects can occur. Engine speed values N1 and N2 define a value range for the engine speed within which the triggering frequency is set off-resonance.

If it was recognized that the engine speed lies in the engine speed window, in step 250 a flag is set to 1. In step 260 that follows, frequency F is increased by value ΔF1 that can be preselected. This value ΔF1 determines the slope of the frequency over time. Subsequent query 265 checks whether frequency F has exceeded limit value FG. If so, in step 266 frequency F is set to limit value FG. Then step 270 follows. If the frequency is less than limit value FG, step 270 follows immediately, in which the triggering signal calculated in this way is applied the actuator. Then the program continues in step 210.

If queries 230 and 240 recognize that the engine speed lies outside the window defined by engine speeds N1 and N2, query 275 follows which checks whether flag M is set to 1. If so, in step 280 the flag is set to 2. Subsequent query 285 checks whether the frequency is less than or equal to frequency value FN set at the beginning. If not, the frequency is decreased in step 290 by value ΔF2. Then step 270 follows again.

If query 275 recognizes that the flag is not equal to 1, query 295 checks whether flag M is set to 2. If so, query 285 occurs again. If query 285 recognizes that the frequency is less than or equal to frequency FN set at the beginning or if query 295 recognizes that the flag setting is not equal to 2, in step 298 flag M is set to 0. Then the program continues with step 200.

Alternatively, it can also be provided that within the window in step 260, frequency F is decreased by value ΔF that can be preselected and outside the window is increased in step 290.

In FIG. 3, the contents of flag M and frequency F are entered over time T. At the beginning, queries 230 and 240 recognize that the engine speed lies within the engine speed window. Thus flag M assumes the value 1 and frequency F increases with a slope defined by step width ΔF1. At time T1, queries 230 and 240 recognize that the engine speed leaves the engine speed window and flag M has previously been set to 1. Starting at this point, flag M is set to 2 and the frequency drops with the slope defined by variable ΔF2, until at time T3 it reaches original value FN. Starting at time T3, the frequency remains at reference value FN.

In another exemplary embodiment of the process according to the present invention, frequency F of the actuator triggering signal is set off-resonance continuously in time between two limit frequencies over the entire operating range. Since, because of this operating mode, the interfering signal frequency is not in phase with the triggering signal frequency over a longer period of time at any operating point, the requirements for resonance to occur are not present. The manipulated variable error that develops due to the change in triggering signal frequency can be compensated by a correction value dependent on triggering frequency. The remaining error in the manipulated value is compensated for by the controller.

Figure 4:
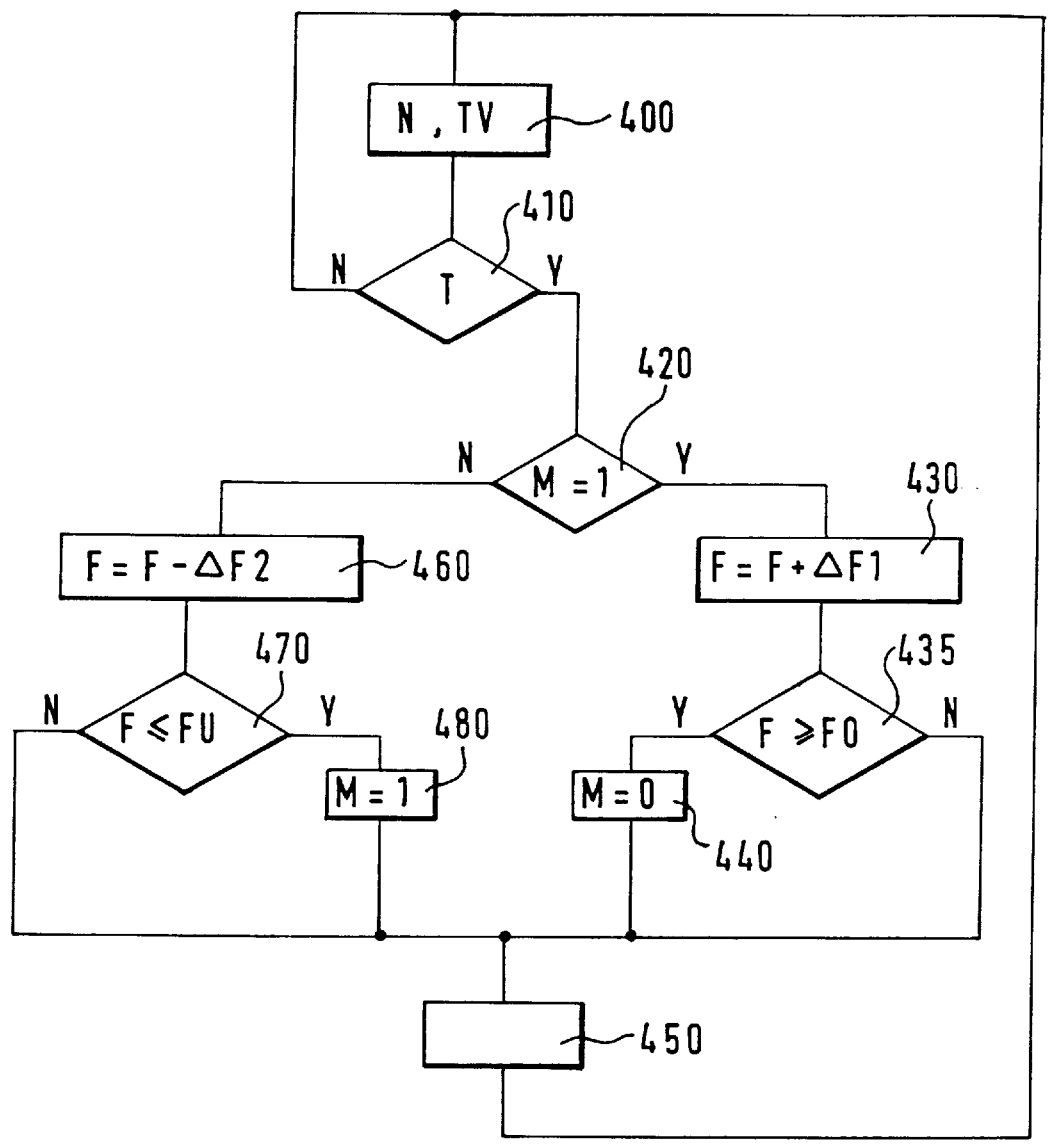
FIG. 4 shows a flow chart of a second exemplary embodiment of the process according to the present invention.

The procedure according to the present invention is shown in the flow chart in FIG. 4. In step 400, the speed is detected as in step 200 in FIG. 2 and the duty cycle is determined. Subsequent query 410 checks whether a time condition has been fulfilled since the last query. If not, step 400 occurs again. Otherwise query 420 occurs, which checks whether a flag assumes the value 1. If so, in step 430, frequency F is increased by value ΔF1 that can be preselected.

Subsequent query 435 checks whether the frequency has exceeded upper limit value FO. If so, in step 440, flag M is set to 0. Then in step 440 or when the frequency is still not greater than or equal to upper threshold value FO, step 450 follows with the actuator being triggered with the signal calculated in this way.

If query 420 recognizes that the flag is not equal to 1, step 460 follows, in which frequency F is decreased by value ΔF2. Subsequent query 470 checks whether frequency F is less than or equal to a lower threshold value FU. If so, the flag in step 480 is set to 1. Then at step 480, or when query 470 recognizes that frequency F is not less than or equal to lower threshold value FU, step 450 also follows.

This procedure is especially advantageous if the resonance effects occur over the entire engine speed range. According to the present invention, starting from base frequency FU, to which the applicable duty cycle map relates, the currently effective triggering frequency F increases in a linear manner with a speed that can be set. Here, the change direction reverses and the currently active triggering frequency F is decreased to lower limit frequency FU.

FIG. 5 shows the curve of frequency F over time T. Starting at time T0, the frequency increases in a linear manner from value FU over time t until frequency value FO that is reached at time T1. Starting at time T1, frequency F decreases in a linear manner over time t to time T2 at which value FU is reached again. The triggering frequency curve over time corresponds to a triangular function. Because of the step-by-step frequency change no exact linear change occurs, but only an approximately linear function over time.

Limit values FU and FO, step widths ΔF1 and ΔF2 and time T can be preselected within the application. It is especially advantageous if different values can be preselected for step widths ΔF1 and ΔF2. Alternatively to the linear frequency increase and decrease over time that is described, other frequency curves can also be selected over time. Any desired function can be selected for the dependence of the frequency on the time. The advantage of the linear frequency curve described over time is that it is easily programmable.

What is claimed is:

1. A process for triggering an actuator in cycles, the process comprising the steps of:

detecting an engine speed value;

determining whether the engine speed value is within a predetermined value range; and when the engine speed value is within the predetermined value range, varying a triggering signal frequency over time according to a predetermined function, the predetermined function being independent of the engine speed value, wherein the triggering signal frequency is varied to prevent resonance effects.

2. The process according to claim 1, wherein the actuator is triggered in cycles of an internal combustion engine.

3. The process according to claim 1, wherein the step of varying the triggering signal frequency over time according to the predetermined function includes the step of:

starting from a first frequency value, increasing the triggering signal frequency over time in a linear manner.

4. The process according to claim 1, wherein the step of varying the triggering signal frequency over time according to the predetermined function includes the step of:

linearly increasing the triggering signal frequency.

5. The process according to claim 3, wherein the step of varying the triggering signal frequency over time according to the predetermined function includes the step of:

increasing the triggering signal frequency until a second frequency value is reached.

6. The process according to claim 1, wherein the step of varying the triggering signal frequency over time according to the predetermined function includes the step of:

starting from a preselected frequency value, decreasing the triggering signal frequency over time.

7. The process according to claim 1, further comprising the step of:

if the engine speed value is outside of the predetermined value range, decreasing the triggering signal frequency.

8. The process according to claim 7, wherein the step of decreasing the triggering signal frequency includes the step of:

decreasing the triggering signal frequency until a first frequency value is reached.

9. A device for triggering an actuator, comprising:

an adjusting arrangement for determining whether an engine speed value is within a predetermined value range and for varying a triggering signal frequency over time, when the engine speed value is within the predetermined value range, according to a predetermined function, the predetermined function being independent of the engine speed value, wherein the triggering signal frequency is changed to prevent resonance effects.

10. The device according to claim 9, wherein the actuator is triggered in cycles of an internal combustion engine.

11. The device according to claim 9, wherein the actuator adjusts an injection actuator of a self-igniting internal combustion engine.

12. The process according to claim 1, wherein the triggering signal frequency assumes a constant value when the engine speed value is outside of the predetermined value range.

13. The process according to claim 1, wherein the step of varying the triggering signal frequency over time according to the predetermined function includes the step of:

generating a triggering signal frequency value over a range of values between a first frequency value and a second frequency value according to the predetermined function.

* * * * *